United States Patent
Yano et al.

(10) Patent No.: US 8,720,403 B2
(45) Date of Patent: May 13, 2014

(54) HAVING A CRANKSHAFT AND TWO BALANCER SHAFTS

(75) Inventors: Takahiro Yano, Kawogawa (JP); Michio Hirano, Akashi (JP); Shinya Akase, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 324 days.

(21) Appl. No.: 13/221,265

(22) Filed: Aug. 30, 2011

(65) Prior Publication Data

US 2012/0055438 A1    Mar. 8, 2012

(30) Foreign Application Priority Data

Sep. 6, 2010  (JP) ................................ P2010-198945

(51) Int. Cl.
 *F02B 75/06*   (2006.01)

(52) U.S. Cl.
 USPC ......................................... 123/192.2; 74/603

(58) Field of Classification Search
 USPC ...................... 123/192.1, 192.2; 74/603, 604
 See application file for complete search history.

(56) References Cited

U.S. PATENT DOCUMENTS

| | | | |
|---|---|---|---|
| 6,067,950 A | 5/2000 | Kinoshita et al. | |
| 6,523,627 B2 * | 2/2003 | Fukuda | ................... 180/68.4 |
| 2003/0015127 A1 | 1/2003 | Gokan | |
| 2010/0154735 A1 | 6/2010 | Kato et al. | |

FOREIGN PATENT DOCUMENTS

| | | | |
|---|---|---|---|
| CN | 201074653 | | 6/2008 |
| CN | 201461847 U | * | 5/2010 |
| JP | 52-23603 | | 5/1977 |
| JP | 1-134757 | | 9/1989 |
| JP | 4-272544 | | 9/1992 |
| JP | 10-132030 | | 5/1998 |
| JP | 10-169716 | | 6/1998 |
| JP | 10169716 A | * | 6/1998 |
| JP | 2003-35159 | | 2/2003 |
| JP | 2003239757 A | * | 8/2003 |
| JP | 2010-144920 | | 7/2010 |

\* cited by examiner

*Primary Examiner* — Noah Kamen
(74) *Attorney, Agent, or Firm* — Wenderoth, Lind & Ponack, LLP

(57) ABSTRACT

A balancer shaft of an engine includes a pair of journal portions, a first stage balance weight and a second stage balance weight. The first stage balance weight is formed between the journal portions and eccentrically arranged with respect to an axis. The second stage balance weight is formed on a center part of the first stage balance weight in the axial direction and projects outward from the first stage balance weight in a radial direction. The balancer shaft has a recess portion on the opposite side of the eccentricity direction.

13 Claims, 17 Drawing Sheets

HAVING A CRANKSHAFT AND TWO BALANCER SHAFTS

BACKGROUND OF THE INVENTION

1. Field of the Invention

The present invention relates to a balancer shaft of an engine.

2. Description of the Prior Art

A balancer shaft of an engine is arranged substantially in parallel to a crankshaft, and normally interlocked and coupled to the crankshaft so as to be rotated at the same rotation speed as the crankshaft. A balance weight projecting in the radial direction is provided in this balancer shaft.

In such a balancer shaft structure, conventionally, the balancer shaft is formed in such a manner that one part of the balance weight passes between a pair of crank arms (crank webs) of the crankshaft. The balancer shaft is brought close to the crankshaft, and the balancer shaft is compactly arranged in the radial direction of the crankshaft.

Unexamined Japanese Patent Publication No. 04-272544 disclose an engine in which a pair of balance weights is provided on both ends of a balancer shaft in the axial direction of the balancer shaft, and a balancer shaft part between journal portions has a recess portion recessed on the axis side. Thus, the balancer shaft is compactly arranged in the radial direction of a crankshaft.

In the former balancer shaft structure, it is required to eliminate vibration due to rotation of the crankshaft by eccentric weight of only the balance weight. The balance weight is formed in a shape so as to pass between the crank arms of the crankshaft. However, the size of the balance weight in the axial direction is limited to a size that will pass between the crank arms. Thus, when the desired eccentric weight is ensured, a diameter of the balance weight has to be enlarged, and a decrease in size in the radial direction of the crankshaft is limited.

In the latter balancer shaft structure, since the balance weights are respectively provided on the outer sides in the radial direction, the size of the crankshaft in the axial direction is increased.

An object of the present invention is to provide a balancer device of an engine capable of decreasing both size in the direction orthogonal to a crankshaft and size in the axial direction of the crankshaft while sufficiently ensuring eccentric weight of balance weights by devising a shape of a balancer shaft.

SUMMARY OF THE INVENTION

In order to solve the above problem, a balancer shaft of an engine according to the present invention includes a pair of journal portions formed on both ends of the balancer shaft in the axial direction of the balancer shaft, the journal portions being rotatably supported by a crankcase, a first stage balance weight formed between the journal portions, the first stage balance weight being eccentrically arranged relative to an axis of the journal portions into a crank shape and having a recess portion on the opposite side of the eccentricity direction, and a second stage balance weight formed on a substantially center part of the first stage balance weight in the axial direction of the first stage balance weight. The second stage balance weight further projects outward from the first stage balance weight in the radial direction. It should be noted that the crankcase in this case includes a cover member such as a crankcase cover covering one side of a crank chamber.

The present invention can be provided with the following configurations in addition to the above configuration.

(a) The second stage balance weight is positioned between crank arms of a crankshaft when seen in the direction orthogonal to the axis direction of the balancer shaft, and one part of the second stage balance weight can pass through between the crank arms.

(b) The first stage balance weight is formed into a sector shape taking a balancer axis as a sector pivot when seen in the axial direction of the balancer shaft.

(c) The second stage balance weight is formed into a sector shape taking a balancer axis as a sector pivot when seen in the axial direction of the balancer shaft. In this case, preferably, the second stage balance weight further has an oil pull surface dipped in an oil reservoir in the crankcase, and the oil pull surface pulls up oil when the balancer shaft is rotating.

(1) According to the present invention, since it becomes possible to put the balancer shaft close to the crankshaft, the balancer shaft can be compactly arranged in the radial direction of the crankshaft, and while reducing weight of the balancer shaft itself, a gravity center of the balance weights is brought away from an axis of the balancer shaft, and eccentric weight of the balance weights can be increased. Thereby, inertia force generated by rotation of the crankshaft can be effectively eliminated by the compact balancer shaft whose weight is reduced.

Specifically, since the recess portion is formed on the balancer shaft, it becomes possible to avoid contact between a main bearing cap and the like of a connecting rod and the balancer shaft when the balancer shaft and the crank shaft are rotating. In addition, it becomes possible to reduce the thickness of the balancer shaft. Therefore, the weight of the balancer shaft itself can be reduced. Furthermore, since the second stage balance weight is formed on an outer periphery of the first stage balance weight, the gravity center of the entire balance weights can be brought away from the axis of the balancer shaft and the eccentric weight can be increased without significantly eccentrically arranging the first stage balance weight.

(2) As in the configuration (a), since the second stage balance weight is arranged between the crank arms of the crankshaft and the one part of the second stage balance weight can pass through between the crank arms, the balancer shaft can be further compactly arranged while effectively utilizing a space between the crank arms and increasing the eccentric weight of the balance weights.

(3) As in the configuration (b), since the first stage balance weight is formed into a sector shape taking the balancer axis as a sector pivot when seen in the axial direction of the balancer shaft, the weight of the balancer shaft itself can be reduced while avoiding contact with the crankshaft and the connecting rod. Furthermore, the gravity center of the entire balance weights can be positioned further away from the balancer axis, and the eccentric weight of the entire balance weights can be increased.

(4) As in the configuration (c), since the second stage balance weight is formed into a sector shape taking the balancer axis as a sector pivot when seen in the axial direction of the balancer shaft, the same effect as the configuration (b) can be obtained. Moreover, since the oil pull surface is formed in the second stage balance weight, the oil in the crankcase can be pulled up and the inside of the crankcase and points of a cylinder head can be lubricated without forming an oil pull part in the crankshaft (or the connecting rod).

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

First Embodiment of the Invention

FIGS. 1 to 17 show an engine with an inclined cylinder according to a first embodiment of the present invention. The embodiment of the present invention will be described based on these figures.

(Configuration of Entire Engine)

Figure 1:
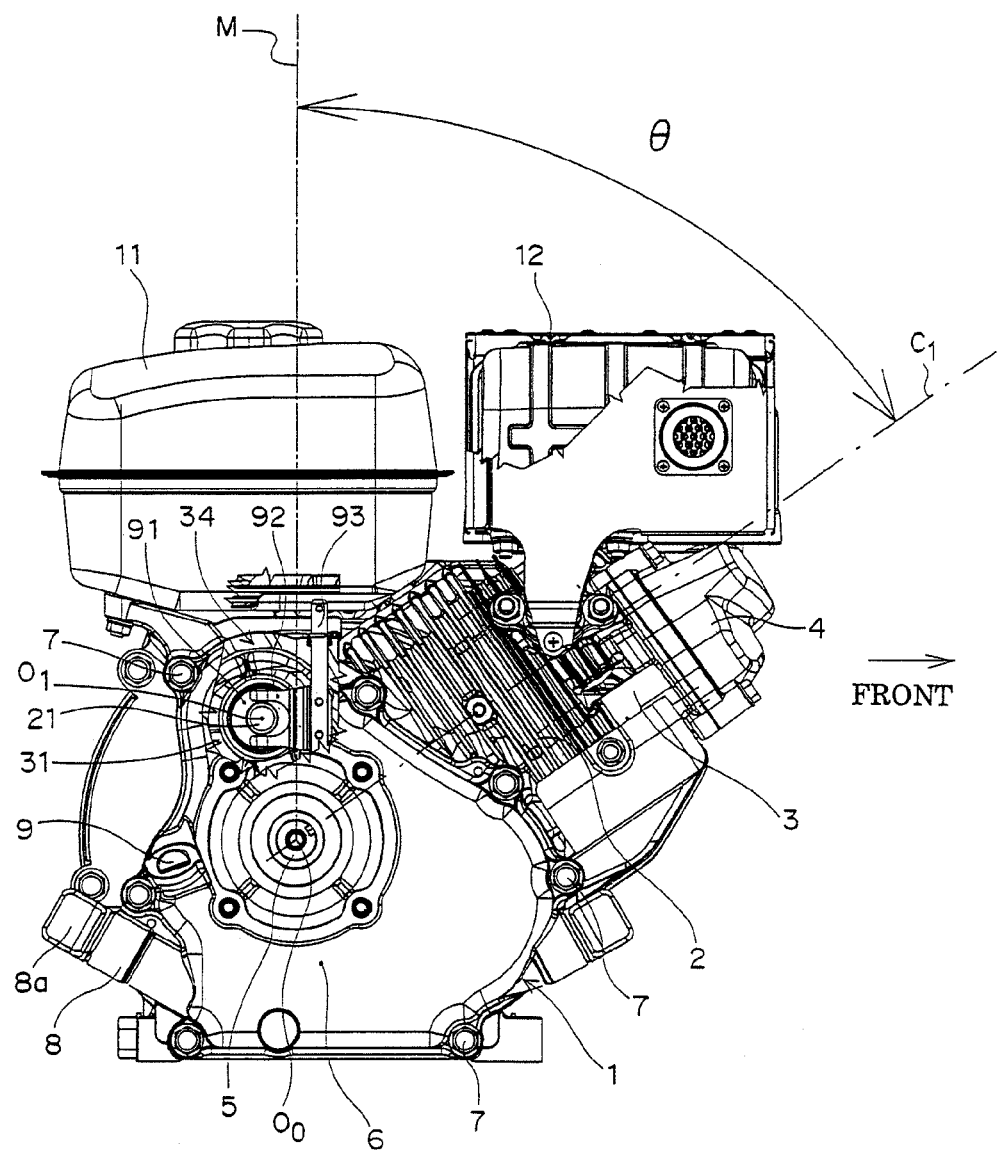
FIG. 1 is a side view showing an engine with an inclined cylinder according to a first embodiment of the present invention in which part of a crankcase cover is cut out.

FIG. 1 is a side view in which the engine with the inclined cylinder is seen in the axial direction of a crankshaft 5. For convenience of description, the side toward which a cylinder 2 is inclined in the horizontal direction orthogonal to the substantially horizontal crankshaft 5 is regarded as the "front side", and the axial direction of the crankshaft 5 seen from the rear side of the engine is regarded as the "lateral direction (right and left direction)" of the engine.

In FIG. 1, the cylinder 2 is formed on an upper surface in a front half part of a crankcase 1 integrally with the crankcase 1, and a cylinder head 3 and a head cover 4 are successively fastened to the cylinder 2. A center line $C_1$ of the cylinder 2 is inclined toward the front side by a fixed angle θ (such as 55 to 60 degrees) relative to a vertical line M intersecting with an axis $O_0$ of the crankshaft 5. A crankcase cover 6 is fastened onto a right end surface in the lateral direction (axial direction of the crankshaft 5) of the crankcase 1 by a plurality of bolts 7 (some of the bolts are given the reference numerals in the figure). A right end of the crankshaft 5 protrudes outward from the crankcase cover 6 as an output shaft part. A fuel tank 11 is arranged on the upper side of a rear half part of the crankcase 1, and an exhaust muffler 12 is arranged on the upper side of the cylinder head 3 and the head cover 4.

An oil gauge attachment portion 8 is opened in a lower rear end of the crankcase 1, and an oil gauge 8a is inserted from the oil gauge attachment portion 8 into the crankcase 1. Further, a sensor attachment portion (in a non-opened state) 9, into which an oil level sensor provided with a float can be inserted and fixed, is formed on the upper side of the oil gauge attachment portion 8 as an option. In this sensor attachment portion 9, an opening is formed by mechanical processing or the like in a case where the oil level sensor is attached.

Figure 2:
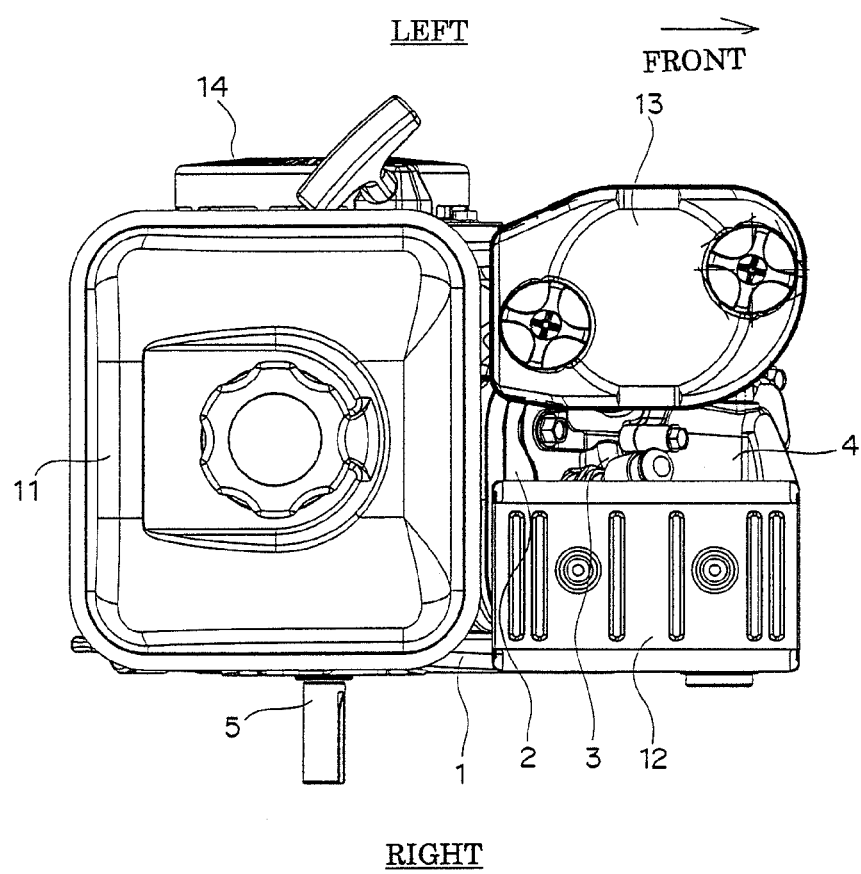
FIG. 2 is a plan view of the engine with the inclined cylinder of FIG. 1.

FIG. 2 is a plan view of FIG. 1, the fuel tank 11 is arranged on the upper side of the rear half part of the crankcase 1 and is formed into a substantially rectangular shape in plan view. The exhaust muffler 12 is arranged on the upper side of the cylinder head 3 and the head cover 4 in line with an air cleaner 13 in the lateral direction. For example, the exhaust muffler 12 is arranged on the right side and the air cleaner 13 is arranged on the left side. A recoil starter 14 is provided on the left side of the crankcase 1.

Figure 3:
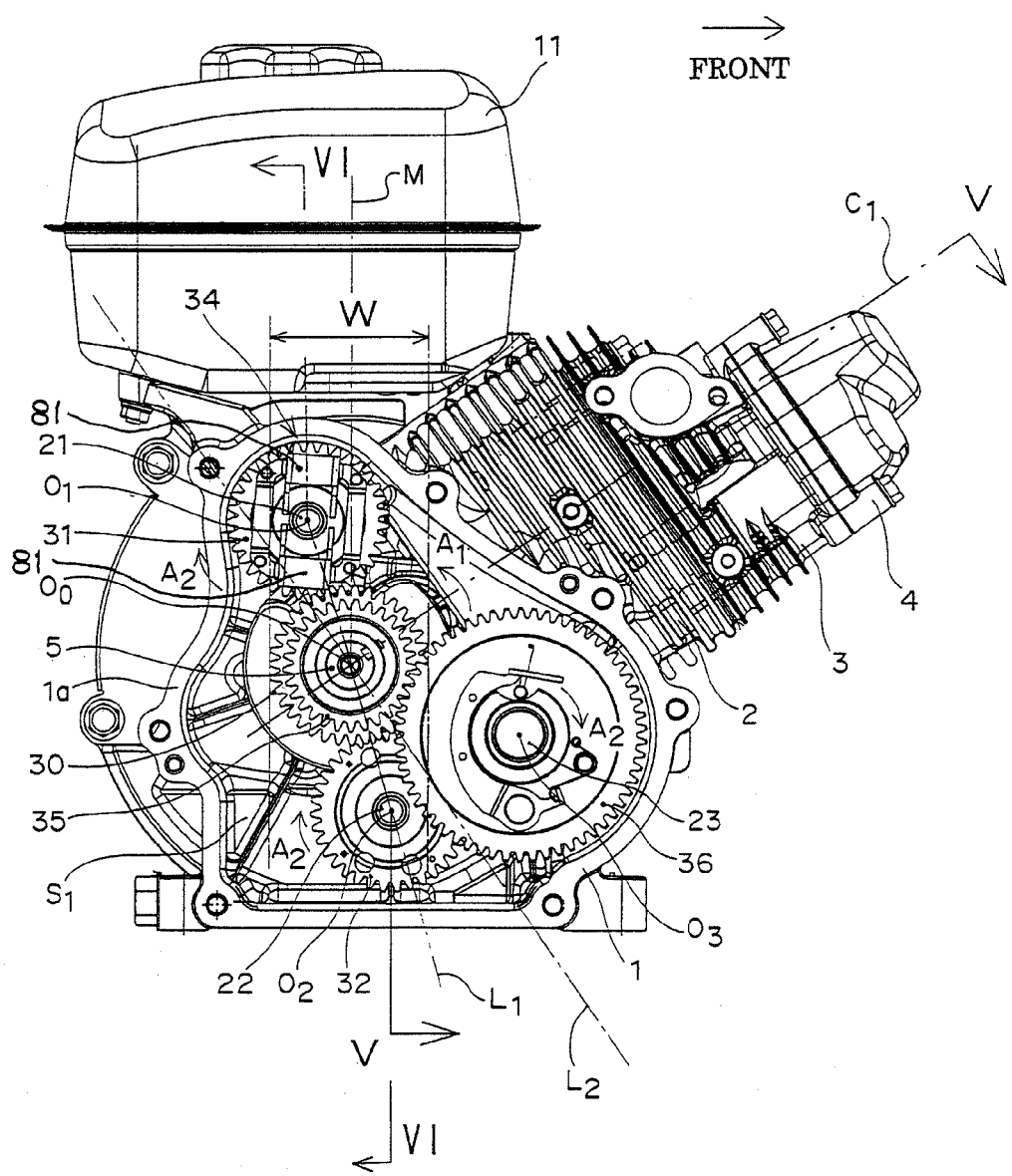
FIG. 3 is a side view showing the engine with the inclined cylinder of FIG. 1 in which the crankcase cover, an exhaust muffler, and an air cleaner are removed.

FIG. 3 is a side view of the engine in which the crankcase cover 6, the exhaust muffler 12, and the air cleaner 13 of FIG. 1 are removed. In the crankcase 1, a first balancer shaft 21, a second balancer shaft 22, and a cam shaft 23 for driving intake and discharge valves are arranged substantially in parallel to the crankshaft 5.

A drive mechanism for the first and second balancer shafts 21, 22 includes one drive gear 30 secured to the crankshaft 5, and first and second driven gears 31, 32 respectively secured to the balancer shafts 21, 22 and meshed with the drive gear 30. The first and second driven gears 31, 32 have a gear structure of the same diameter and the same number of teeth as the drive gear 30. That is, by respectively transmitting mechanical force from the crankshaft 5 to the first and second balancer shafts 21, 22 via the drive gear 30 and the first and second driven gears 31, 32, the first and second balancer shafts 21, 22 are rotated in the opposite direction A2 to the rotation direction A1 of the crankshaft 5 at the same rotation speed as the crankshaft 5.

The first driven gear 31 also has a function as a governor gear. Although described in detail later, a flyweight type governor mechanism 34 is installed onto an end surface of the first driven gear 31.

A drive mechanism of the cam shaft 23 includes a cam driven gear 35 secured to the crankshaft 5, and a cam driven gear 36 secured to the cam shaft 23 and meshed with the cam drive gear 35. The cam driven gear 36 has a diameter and the number of teeth which are twice more than the cam drive gear 35. That is, the cam shaft 23 is rotated in the opposite direction A2 to the rotation direction A1 of the crankshaft 5 at a rotation speed which is half of the crankshaft 5.

(Layout of both Balancer Shafts 21, 22 and Cam Shaft 23)

In the present embodiment, the first and second balancer shafts 21, 22 are arranged at positions regulated by the following items (a) to (e) when seen from the side of the engine, that is, in the axial direction of the crankshaft 5.

(a) In FIG. 3, an axis $O_1$ of the first balancer shaft 21 (hereinafter, referred to as the "first balancer axis") and an axis $O_2$ of the second balancer shaft 22 (hereinafter, referred to as the "second balancer axis") are arranged so as to positioned on opposite sides of a center line $C_1$ of the cylinder 2 (hereinafter, referred to as the "cylinder center line"). As a matter of course, since both of the driven gears 31, 32 and the drive gear 30 have the same diameter and the same number of teeth, the first balancer axis $O_1$ and the second balancer axis $O_2$ are positioned at an equal distance away from the crankshaft axis $O_0$.

(b) Both of the balancer shafts 21, 22 are arranged in such a manner that the first balancer axis $O_1$ is positioned on the upper side of the crankshaft axis $O_0$ and the second balancer axis $O_2$ is positioned on the lower side of the crankshaft axis $O_0$.

(c) The first and second balancer shafts 21, 22 are arranged in such a manner that the first balancer axis $O_1$ and the second balancer axis $O_2$ have a phase angle difference of substantially 180 degrees between the balancer shafts 21, 22 around the crankshaft axis $O_0$. In other words, the crankshaft axis $O_0$ and both the balancer axes $O_1$, $O_2$ are positioned on the same straight line L1 when seen in the axial direction of the crankshaft 5. In this case, the straight line L1 on which the three axes $O_0$, $O_1$, $O_2$ are aligned is deviated from a straight line L2 intersecting with the crankshaft axis $O_0$ by a fixed angle (such as 19 degrees) clockwise. The straight line L2 is orthogonal to the cylinder center line C1 of the cylinder 2. Thereby, the first balancer axis $O_1$ on the upper side and the second balancer axis $O_2$ on the lower side are set so as to come close to the vertical line M intersecting with the crankshaft axis $O_0$ in the front and rear direction.

(d) The first balancer axis $O_1$ and the second balancer axis $O_2$ are arranged within a diameter range (range in the front and rear direction) W of the drive gear 30 for balancer in the front and rear direction.

(e) The first balancer axis $O_1$ on the upper side is positioned on the rear side of the vertical line M intersecting with the crankshaft axis $O_0$ within the diameter range W of the drive gear 30 for balancer, and the second balancer axis $O_2$ on the lower side is positioned on the front side of the vertical line M intersecting with the crankshaft axis $O_0$ within the diameter range W of the drive gear 30.

The cam shaft 23 is arranged in such a manner that an axis $O_3$ thereof is positioned between the second balancer axis $O_2$ on the lower side and a lower end of the cylinder 2.

As described above, by arranging the second balancer shaft 22 on the lower side in such a manner that the axis $O_2$ thereof is placed on the front side of the crankshaft axis $O_0$, a sufficiently wide space portion S1 for arrangement of the oil level sensor, the space portion being capable of accommodating the float of the oil level sensor and the like is ensured in the crankcase 1 on the rear side of the second balancer shaft 22.

Figure 5:
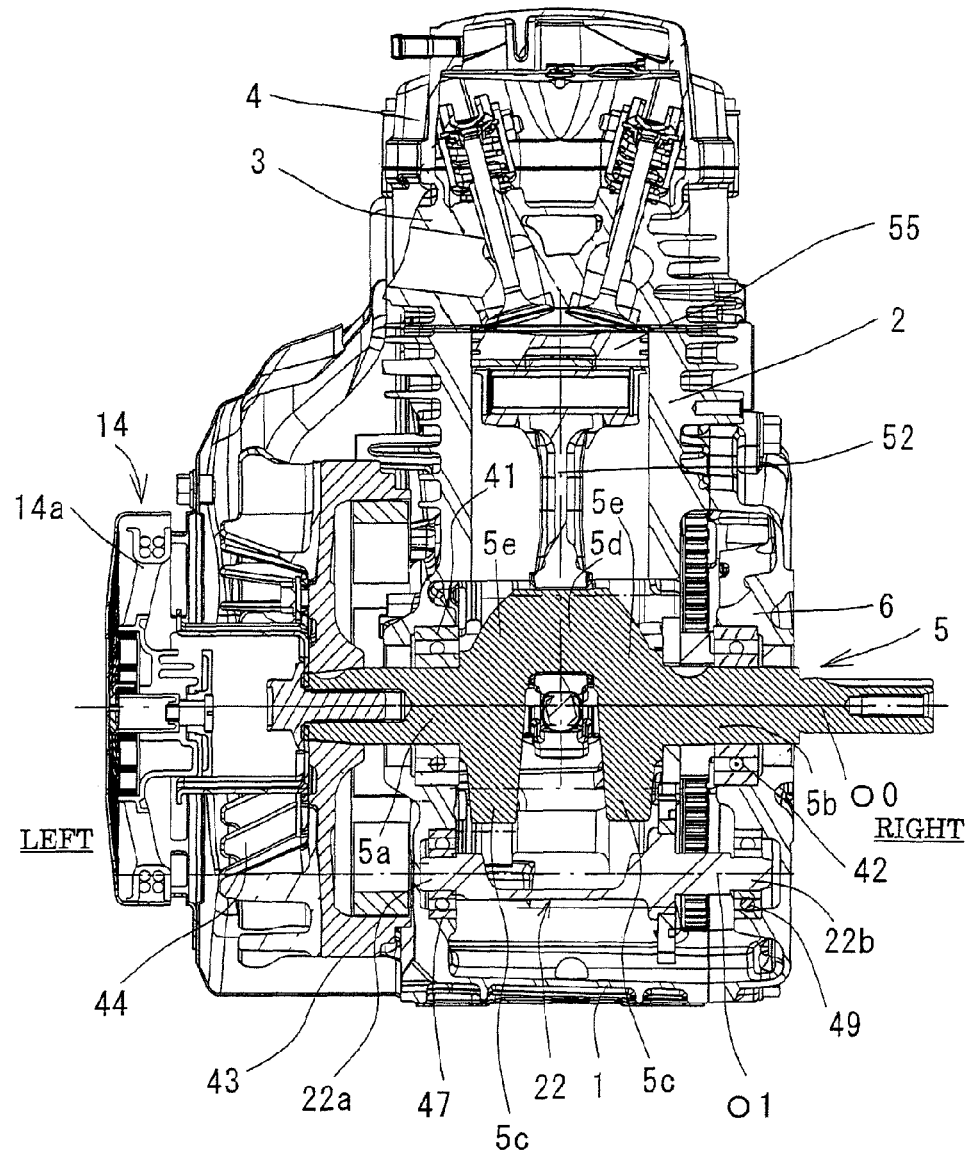
FIG. 5 is a sectional view taken along line V-V of FIG. 3.

FIG. 5 is a sectional view taken along line V-V of FIG. 3. As already known, the crankshaft 5 includes left and right journal portions 5a, 5b, a pair of right and left crank arms 5e, and a crank pin 5d supported by the crank arms 5e. The left journal portion 5a is rotatably supported on a left side wall of the crankcase 1 via a bearing 41, and the right journal portion 5b is rotatably supported on the crankcase cover 6 via a bearing 42. A flywheel 43, a cooling fan 44, and a pulley 14a of the recoil starter 14 are secured to a left end of the crankshaft 5. A recess portion for attachment of a ring gear 43a (refer to FIG. 17) for the starter is formed on an outer peripheral surface of the flywheel 43.

Figure 6:
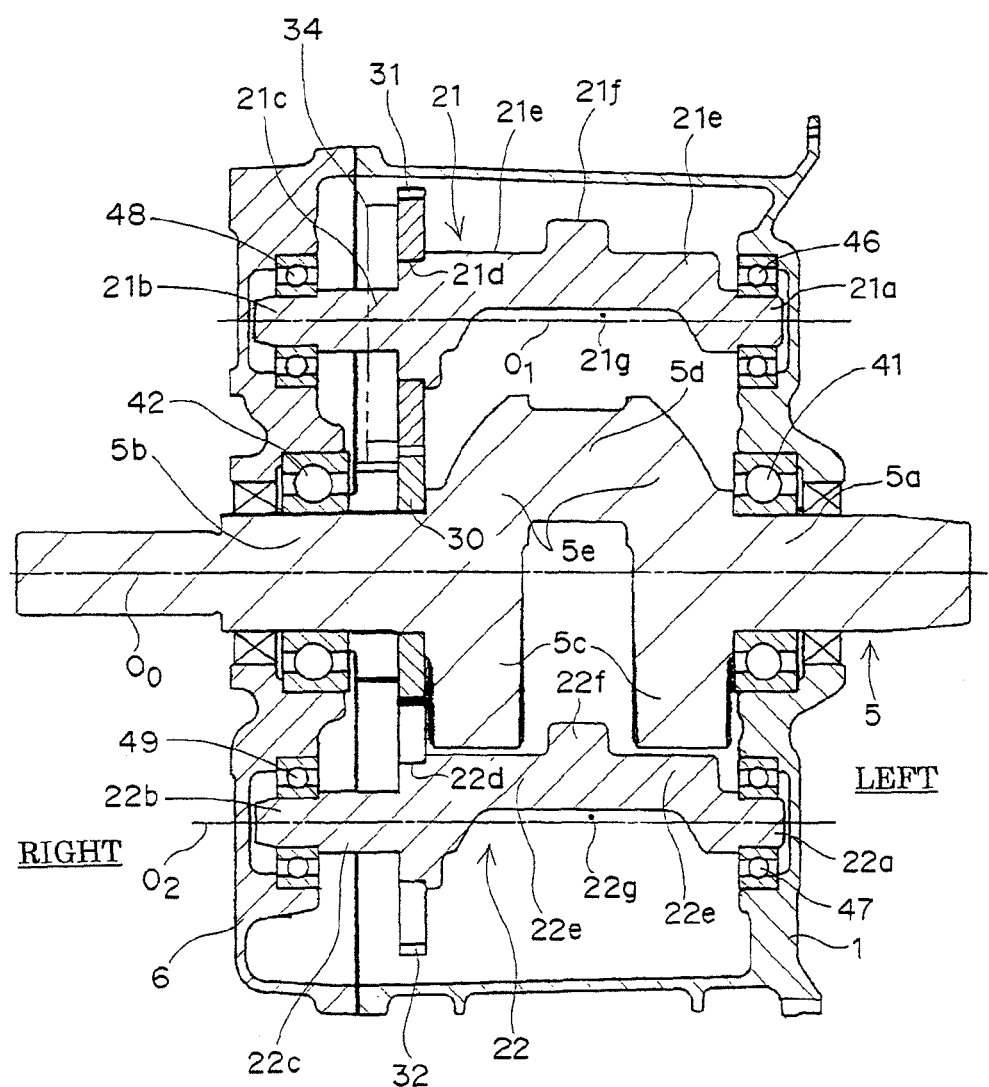
FIG. 6 is a sectional view taken along line VI-VI of FIG. 3 in which a governor mechanism is omitted.

FIG. 6 is a sectional view taken along line VI-VI of FIG. 3 (view seen from the front side). Left journal portions 21a, 22a of the first and second balancer shafts 21, 22 are respectively rotatably supported on the left side wall of the crankcase 1 via bearings 46, 47, and right journal portions 21b, 22b are respectively rotatably supported on the crankcase cover 6 via bearings 48, 49.

(Shape of Balancer Shafts 21, 22)

Figure 13:
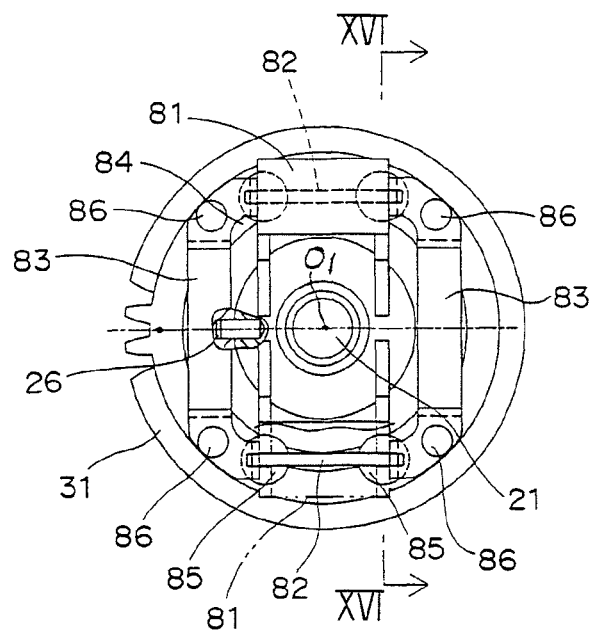
FIG. 13 is a view taken in the direction of arrow XIII of FIG. 12.

In FIG. 6, the first balancer shaft 21 and the second balancer shaft 22 are common parts or members having the same shape. Extended shaft portions 21c, 22c for governor arrangement are respectively formed on the left side of the right journal portions 21b, 22b, and the first and second driven gears 31, 32 are respectively fitted to annular gear attachment surfaces 21d, 22d formed on the left side of the extended shaft portions 21c, 22c. As shown in FIG. 13, the first driven gear 31 is positioned and fixed by a positioning pin 26 in the rotation direction by a predetermined rotation angle relative to the first balancer shaft 21. The second driven gear 32 of FIG. 6 is similarly positioned.

Figure 10:
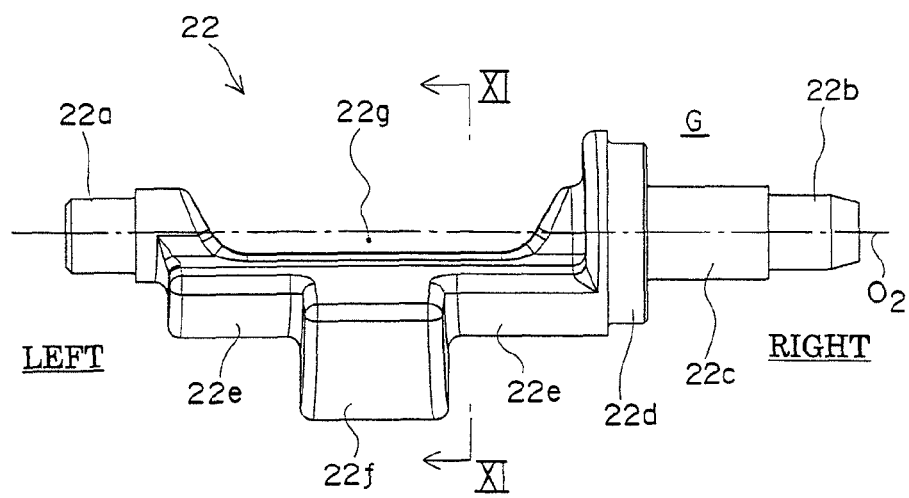
FIG. 10 is a front view of a second balancer shaft.

FIG. 10 is a front view of the second balancer shaft 22 arranged on the lower side. As described above, the second balancer shaft 22 includes the left and right journal portions 22a, 22b, the extended shaft portion 22c, and the annular gear attachment surface 22d, and also integrally includes a first step weight portion 22e formed into a crank shape between gear attachment surface 22d and the left journal portion 22a, and a second step weight portion 22f formed on an outer peripheral surface in a laterally center part of the first step weight portion 22e.

The first step weight portion 22e is formed into a crank shape, so as to have the gravity center deviated (eccentrically-placed) in one direction in the radial direction from the second balancer axis $O_2$, and to have a recess portion 22g recessed on the opposite side of the deviation direction, which is on the side of the second balancer axis $O_2$. The second step weight portion 22f further protrudes in the same direction as the deviation direction of the first step weight portion 22e from the outer peripheral surface of the first step weight portion 22e.

Figure 11:
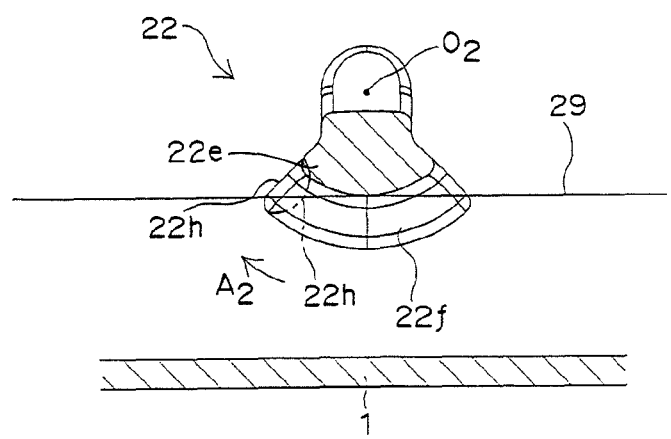
FIG. 11 is a sectional view taken along line XI-XI of FIG. 10.

FIG. 11 is a sectional view taken along line XI-XI of FIG. 10. The first step weight portion 22e is formed into a sector or fan shape taking the second balancer axis $O_2$ as a sector pivot when seen in the axial direction, and an open angle (center angle) thereof is for example substantially 90 degrees.

The second step weight portion 22f is also formed into a sector or fan shape taking the second balancer axis $O_2$ as a sector pivot when seen in the axial direction, and an open angle thereof is 90 degrees which is the same as the first step weight portion 22e.

The vicinity of an outer end in the radial direction of the sector shape second step weight portion 22f is for example soaked in an oil reservoir 29 in the crankcase 1. Thereby, an end surface 22h on the side of the rotation direction A2 of the second step weight portion 22f functions as an oil pull-up surface. It should be noted that in order to improve the function as the oil pull-up surface 22h, the end surface 22h can be formed into an arc recess shape as shown by an imaginary line so as to improve oil pull-up efficiency.

Figure 12:
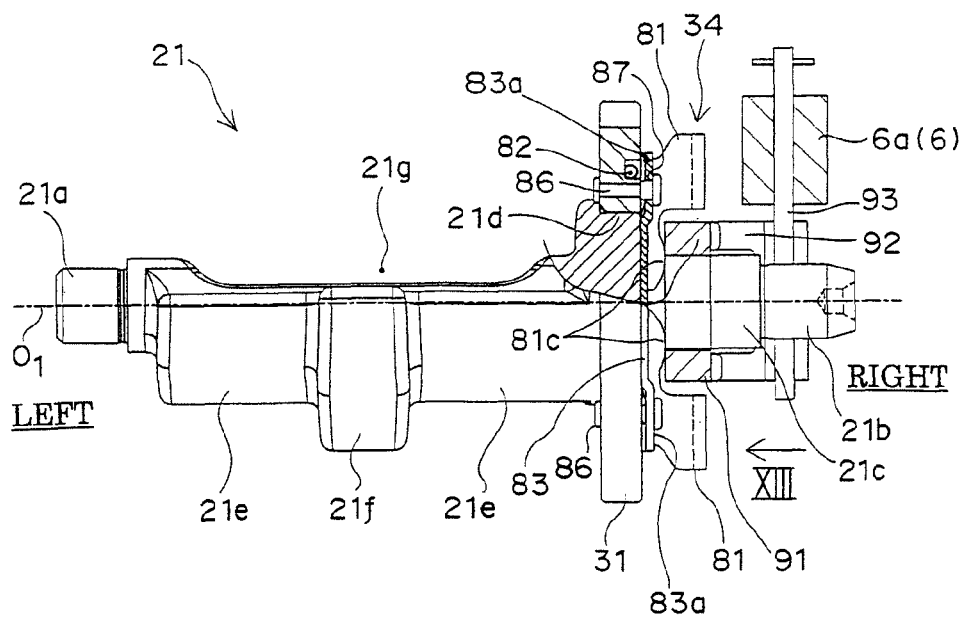
FIG. 12 is a partially sectional front view of a first balancer shaft provided with the governor mechanism.

FIG. 12 is a partially sectional front view showing the first balancer shaft 21 arranged on the upper side. The common parts having the same shape as the second balancer shaft 22 are used as described above. That is, the first balancer shaft 21 integrally includes the left and right journal portions 21a, 21b, the extended shaft portion 21c for the governor arrangement formed on the left side of the right journal portion 21b, the annular gear attachment surface 21d formed on the left side of the extended shaft portion 21c, a first step weight portion 21e having a sector shape section, the first step weight portion 21e being formed into a crank shape between the gear attachment surface 21d and the left journal portion 21a, a second step weight portion 21f having a sector shape section, the second step weight portion 21f being formed on an outer peripheral surface in a laterally center part of the first step weight portion 21e, and a recess portion 21g.

Figure 7:
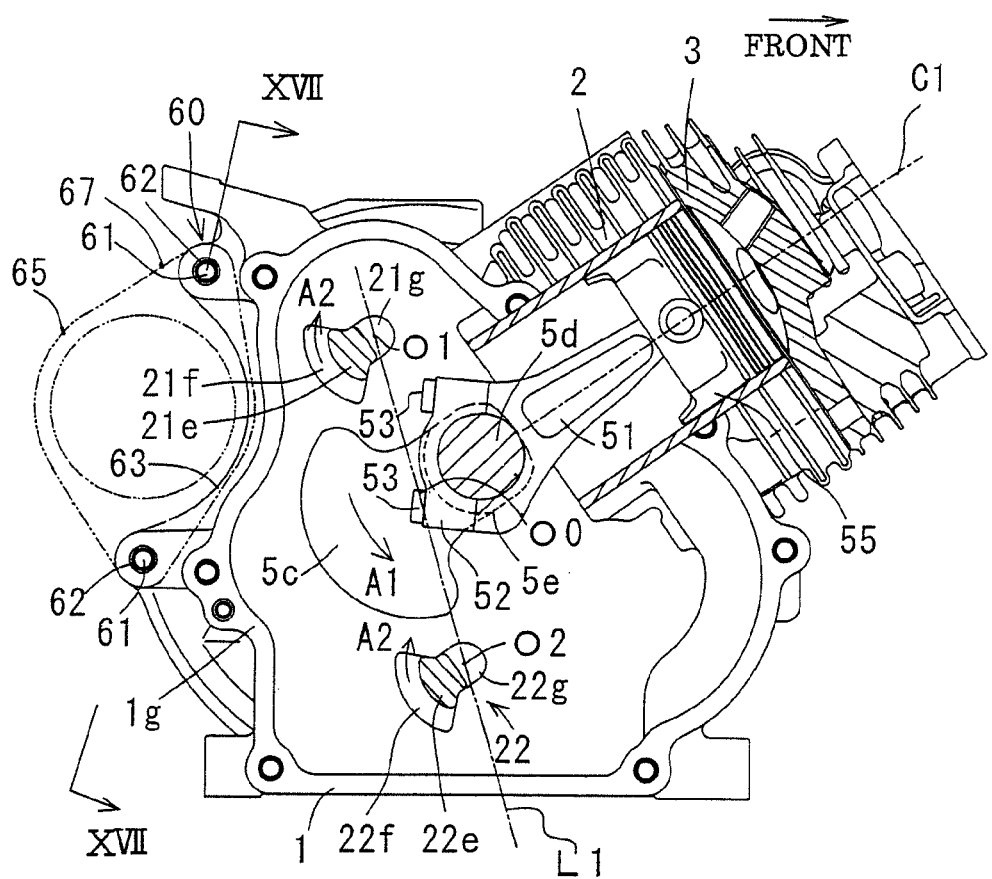
FIG. 7 is a schematic vertically-sectional view of the engine with the inclined cylinder of FIG. 1 showing a relationship between rotation positions of a crankshaft and both balancer shafts at the time of a piston top dead center.

FIG. 7 shows a positional relationship between a weight portion 5c of the crankshaft 5 and the weight portions 21e, 21f, 22e, 22f of the balancer shafts 21, 22 at the time of a top dead center of a piston 55. The weight portion 5c of the crankshaft 5 is directed on the direct opposite side of the cylinder 2 as already known. The first and second step weight portions 21e, 21f, 22e, 22f of the balancer shafts 21, 22 are directed substantially in parallel to and in the same direction as the weight portion 5c of the crankshaft 5. Taking such a positional relationship as a premise, size in the radial direction of the first and second step weight portions 21e, 21f, 22e, 22f of the first and second balancer shafts 21, 22 and size in the radial direction (depth) of the recess portions 21g, 22g are set as follows so as to be placed within such a range that the first and second balancer shafts 21, 22 are not brought into contact with the weight portion 5c of the crankshaft 5, a main bearing cap 52 of a connecting rod 51, and a cap bolt 53 thereof during an engine operation.

Figure 8:
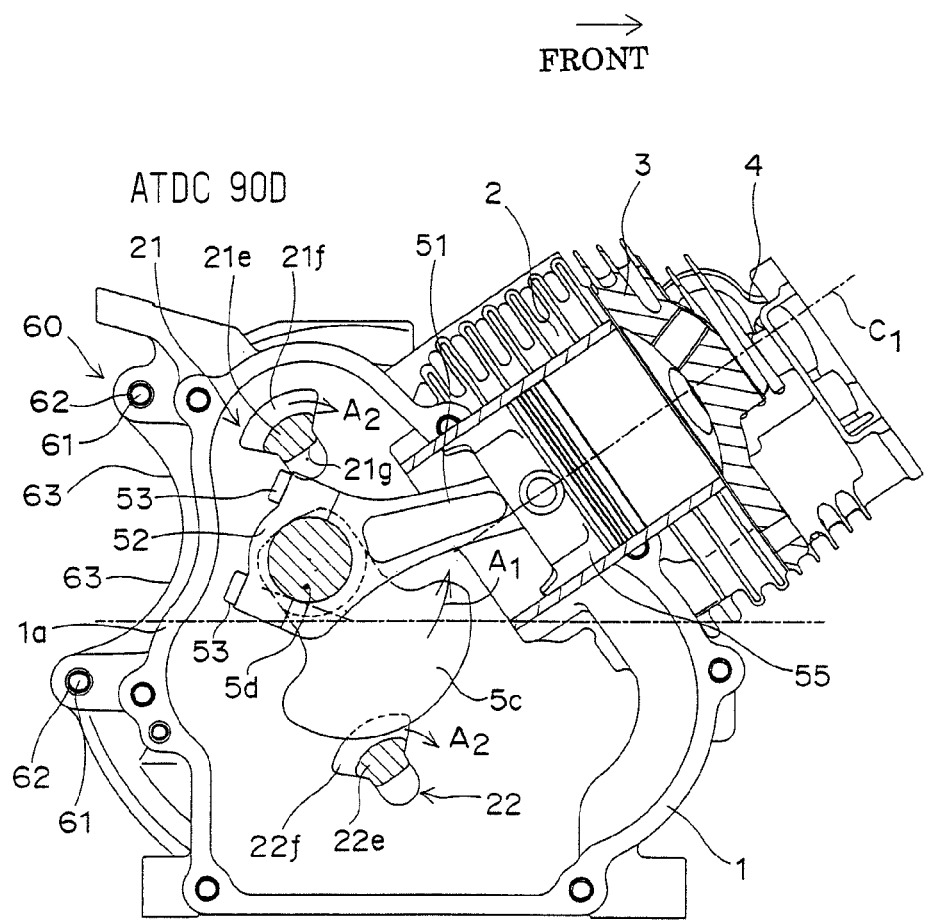
FIG. 8 is a schematic vertically-sectional view of the engine with the inclined cylinder of FIG. 1 showing a relationship between rotation positions of the crankshaft and both of the balancer shafts when the crankshaft and both of the balancer shafts are rotated by substantially 90 degrees from the piston top dead center.

FIG. 8 shows a state that the crankshaft 5 and both of the balancer shafts 21, 22 are rotated by substantially 90 degrees of a crank angle from the top dead center of the piston 55. The weight portion 5c of the crankshaft 5 is moved by substantially 90 degrees in the arrow A1 direction, whereas the first and second step weight portions 21e, 21f, 22e, 22f of the balancer shaft 21, 22 are moved by substantially 90 degrees in the opposite direction A2 to the rotation direction A1 of the crankshaft 5. At this time, the main bearing cap 52 and the cap bolt 53 are brought close to the first balancer shaft 21 on the upper side. However, the depth of the recess portion 21g of the first balancer shaft 21 is set in such a manner that the main bearing cap 52 and the cap bolt 53 are not brought into contact with the first balancer shaft 21. That is, the depth of the recess portion 21g is set in such a manner that the main bearing cap 52 and the cap bolt 53 can pass through a space of the recess portion 21g.

Regarding the second balancer shaft 22, the second step weight portion 22f thereof is overlapped with the weight portion 5c of the crankshaft 5 when seen in the axial direction. However, as in FIG. 6, the second step weight portion 22f is arranged in a space of the weight portion 5c (between the crank arms 5e) of the crankshaft 5 and formed with a narrower width than the space of the weight portion 5c. Thereby, the second step weight portion 22f comes into the space of the weight portion 5c of the crankshaft 5, and the weight portion 5c of the crankshaft 5 and the second step weight portion 22f of the second balancer shaft 22 are not brought into contact with each other.

A radius of a sector shape of the first step weight portion 22e of the second balancer shaft 22 is set in such a manner that an outer peripheral surface of the first step weight portion 22e can be brought close to an outer peripheral surface of the weight portion 5c of the crankshaft 5 as far as possible while not being brought into contact with the outer peripheral surface.

Figure 9:
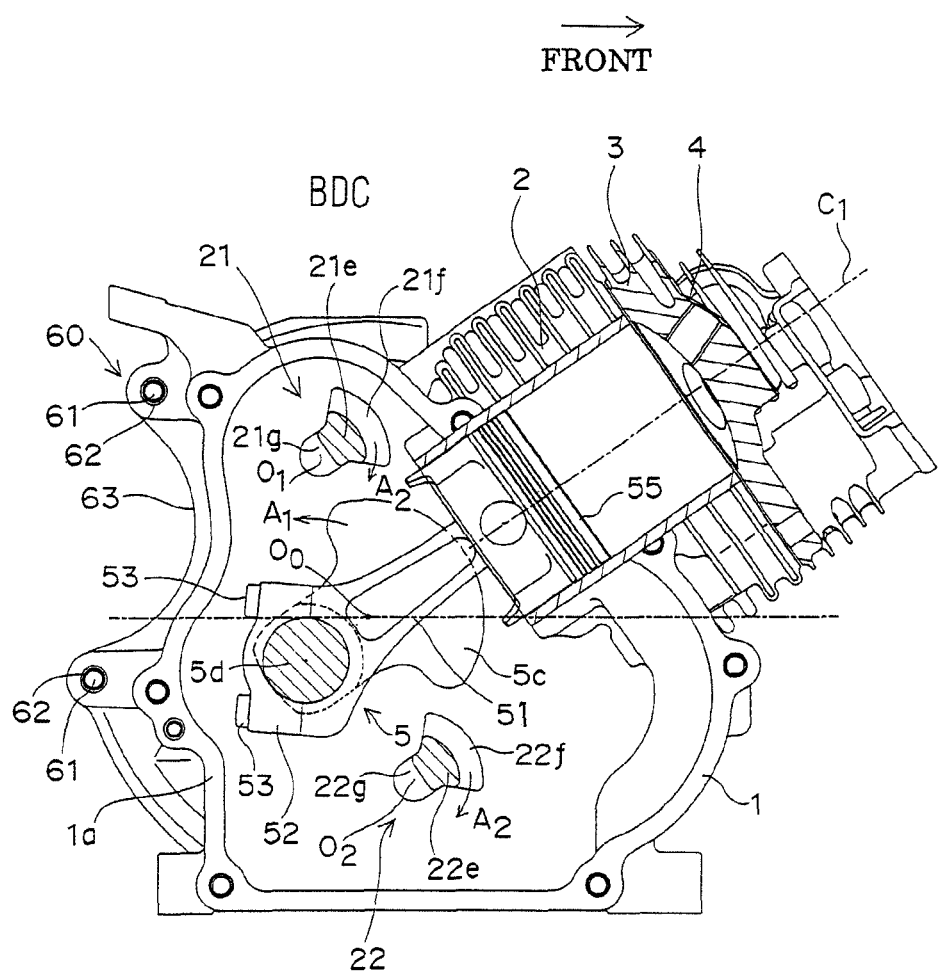
FIG. 9 is a schematic vertically-sectional view of the engine with the inclined cylinder of FIG. 1 showing a relationship between rotation positions of the crankshaft and both of the balancer shafts at the time of a piston bottom dead center.

FIG. 9 shows a state of a bottom dead center of the piston 55. The weight portion 5c of the crankshaft 5 is directed to the cylinder 2, and the first and second step weight portions 21e, 21f, 22e, 22f of the balancer shafts 21, 22 are also directed in parallel to and in the same direction as the weight portion 5c of the crankshaft 5.

It should be noted that when the crankshaft 5 and both of the balancer shafts 21, 22 are further rotated by substantially 90 degrees of the crank angle from the bottom dead center of the piston 55 of FIG. 9, the positional relationship between the first and second step weight portions 21e, 21f, 22e, 22f of the balancer shafts 21, 22 and the weight portion 5c of the crankshaft 5 is opposite to the case of FIG. 8. Namely, in a state that the crankshaft 5 further rotates by substantially 90 degrees from the state of FIG. 9, the second step weight portion 21f of the first balancer shaft 21 is inserted in the space of the weight portion 5c of the crankshaft 5, whereas the main bearing cap 52 and the cap bolt 53 pass through a space of the recess portion 22g of the second balancer shaft 22.

As described above, the shape and the size of the first and second balancer shafts 21, 22 are determined in such a manner that the balancer shafts 21, 22 are not brought into contact with the crankshaft 5, the weight portion 5c thereof, the main bearing cap 52, the cap bolt 53, and the like. As a matter of course, weight and the like thereof are basically determined so as to eliminate unbalances due to inertia force and the like of the piston 55.

(Attachment Structure of Starter Motor)

In the engine with the inclined cylinder of the present embodiment, as shown in FIG. 7, a starter motor attachment portion 60 is formed on a rear wall 1a of the crankcase 1 integrally with the crankcase 1 in such a manner that the engine can also be manufactured with a specification that a starter motor is provided.

The starter motor attachment portion 60 is formed so as to protrude rearward from the rear wall 1a of the crankcase 1, and a pair of female screw holes (attachment holes) 61 is formed so as to be spaced from each other substantially in the up and down direction, and an arc shape recess portion 63 recessed on the front side is formed between the upper and lower female screw holes 61 in order to decrease the size in the front and rear direction of the crankcase 1 and to stabilize an attachment state of a starter motor 65.

Figure 17:
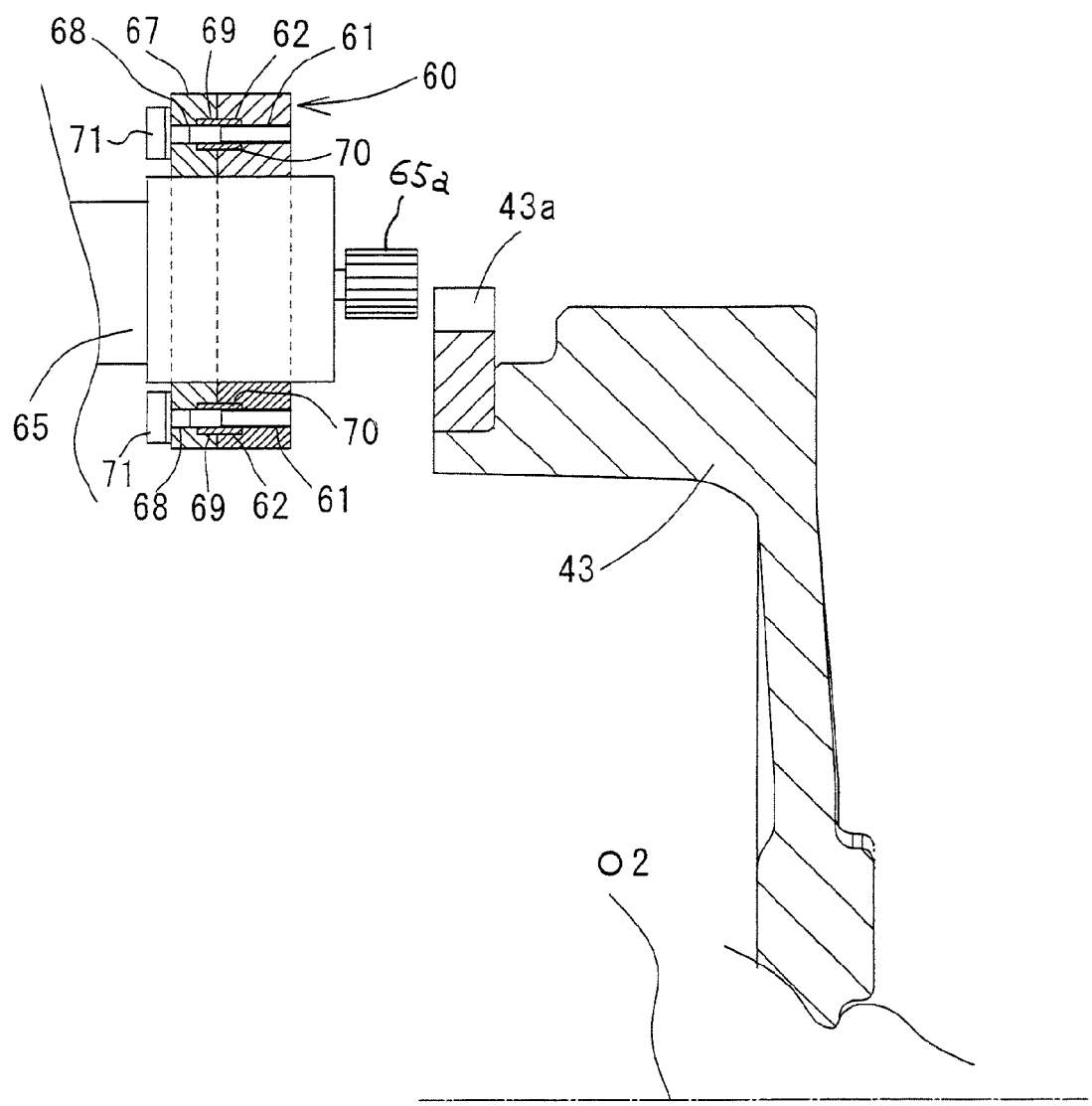
FIG. 17 is an enlarged sectional view showing a section taken along line XVII-XVII of FIG. 7 in which a starter motor is attached.

FIG. 17 is a view corresponding to a section taken along line XVII-XVII of FIG. 7, the view showing a state in which the starter motor 65 is attached. A plurality of positioning holes 62 is respectively formed in the female screw holes 61 coaxially with the female screw holes 61. Each of the positioning holes 62 has a larger inner diameter than an inner diameter of the female screw hole 61. Meanwhile, a plurality of in bolt insertion holes 68 is formed in a flange portion 67 of the starter motor 65, and a plurality of positioning holes 69 having a larger diameter than an inner diameter of the bolt insertion holes 68 is respectively formed in the bolt insertion holes 68. A diameter of the positioning hole 69 is the same as the diameter of the positioning hole 62 of the starter motor attachment portion 60. The positioning holes 68 are formed coaxially with the bolt insertion holes 68. That is, by fitting tubular positioning pins 70 into both of the positioning holes 62, 69, the starter motor 65 is positioned in the direction substantially orthogonal to the crankshaft 5, and a pinion gear 65a of the starter motor 65 is positioned relative to the ring gear 43a of the flywheel 43. It should be noted that although a Bendix type (inertia slide type) of pinion gear is utilized as the pinion gear 65a, a so-called shift type pinion gear can also be utilized.

In a case where the starter motor 65 is attached, as shown by imaginary lines in FIG. 7, an outer peripheral surface of the starter motor 65 is matched with the arc shaped recess portion 63, and as in FIG. 17, the flange portion 67 of the starter motor 65 is overlapped with the starter motor attachment portion 60. At this time, by fitting the tubular positioning pins 70 into both of the positioning holes 62, 69, the starter motor 65 is positioned. By screwing bolts 71 inserted into the bolt insertion holes 68 and the tubular positioning pins 70 into the female screw holes 61 of the starter motor attachment portion 60, the starter motor 65 is fixed at a predetermined position.

(Structure of Governor)

Figure 14:
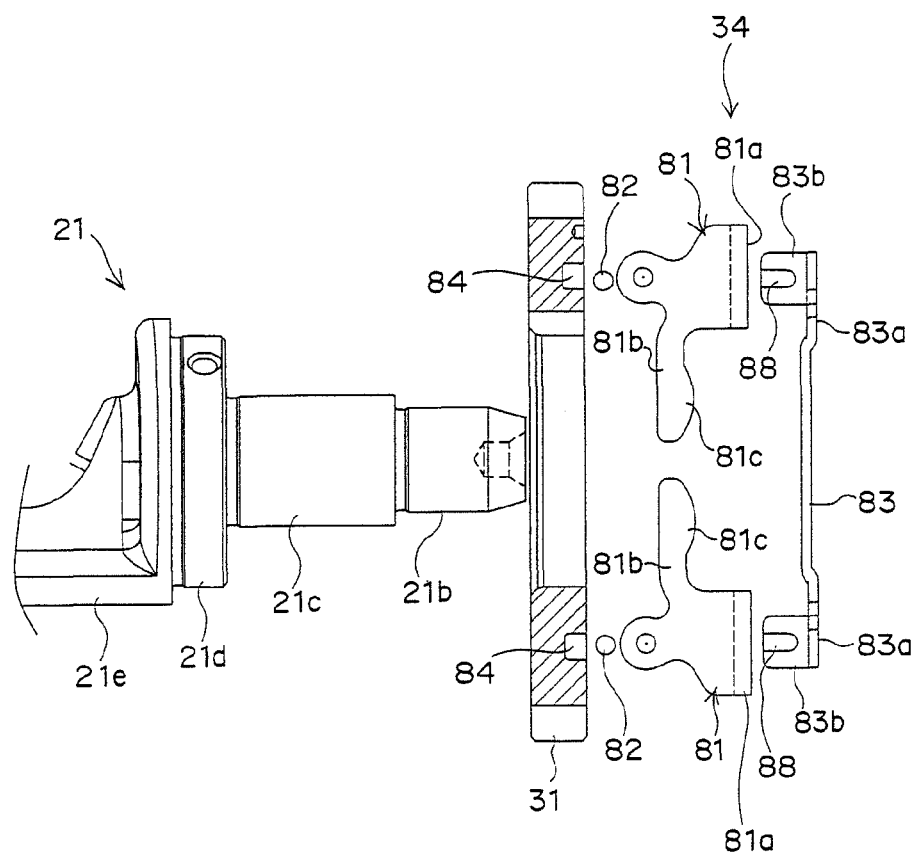
FIG. 14 is an enlarged front view showing part of FIG. 12 in which the governor mechanism is exploded.
Figure 15:
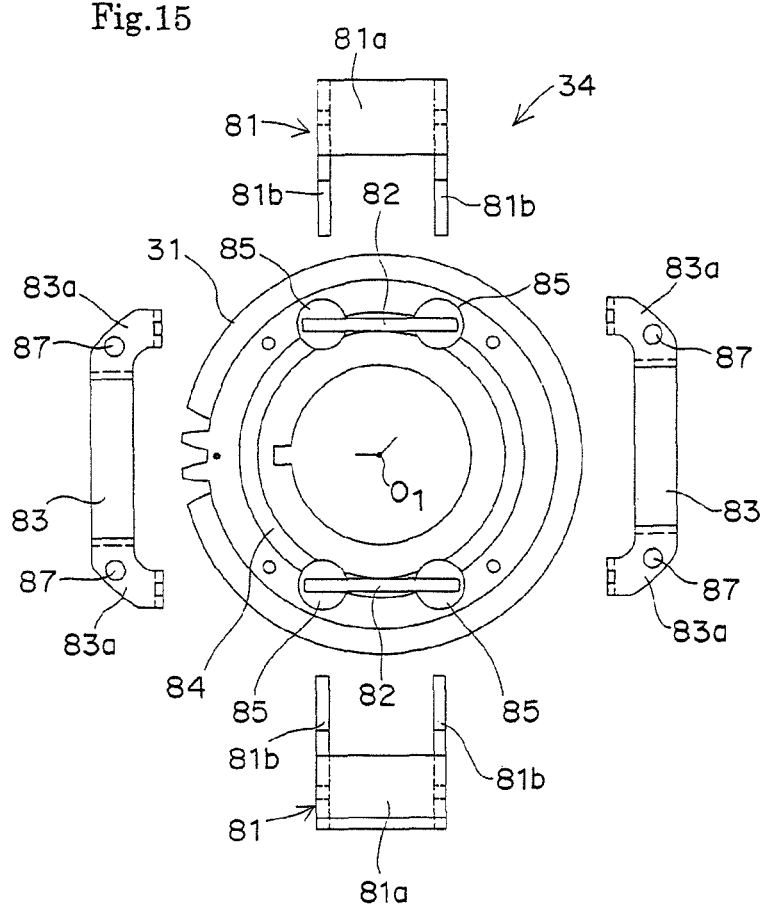
FIG. 15 is a view corresponding to FIG. 13 in which the governor mechanism is exploded.
Figure 16:
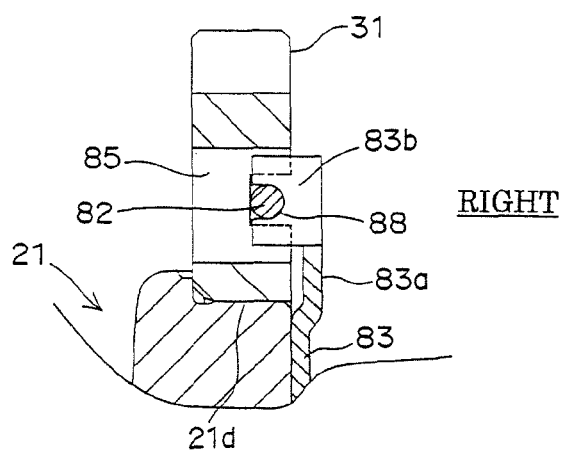
FIG. 16 is an enlarged sectional view showing part of a section taken along line XVI-XVI of FIG. 13.

With FIGS. 12 to 15, a structure of the governor mechanism 34 arranged on the one end surface of the driven gear 31 of the first balancer shaft 21 will be described. FIG. 13 is a view taken in the direction of arrow XIII of FIG. 12, FIG. 14 is an exploded front view of the governor mechanism 34, FIG. 15 is an exploded side view in which the governor mechanism 34 is seen in the axial direction, and FIG. 16 is an enlarged sectional view showing part of a section taken along line XVI-XVI of FIG. 13. In FIG. 14, this governor mechanism 34 includes a pair of flyweights 81, a pair of support pins 82 respectively pivotally supporting the flyweights 81, and a pair of holding members (holders) 83 fixing both of the support pins 82. The support pins 82 are arranged in a recess portion 84 formed on the end surface of the first driven gear 31.

In FIG. 15, the recess portion 84 is formed into an annular shape taking the first balancer axis $O_1$ as center, and both of the support pins 82 are arranged substantially in parallel to each other, and arranged at symmetrical positions to each other with respect to the first balancer axis $O_1$. Through holes 85 are formed in points where the support pins 82 are arranged. For more detail, the four through holes 85 are formed at points corresponding to both ends in the longitudinal direction of the support pins 82. The ends of the support pins 82 come into the through holes 85 from the recess portion 84.

Each of the flyweights 81 is made of sheet metal and includes a rectangular weight portion 81a, and a pair of arm portions 81b formed by bending both ends of the weight portion 81a. Base ends (ends on the side of the first balancer axis $O_1$) of both the arm portions 81b are inserted into parts of the through holes 85 and pivotally supported on the support pins 82.

The pair of holding members 83 are also made of sheet metal, and elongated in the direction orthogonal to the support pins 82, and both ends 83a in the longitudinal direction are inclined into a dogleg shape. Further, as shown in FIG. 16, a bent portion 83b bent on the side of the first driven gear 31 is integrally formed in a front end of each of the ends 83a. A U-shaped groove 88 is formed in the bent portion 83b, and by fitting the U-shaped groove 88 to the support pin 82, the support pin 82 is fixed to the recess portion 84.

As shown in FIG. 15 rivet insertion holes 87 are formed in the ends 83a of the holding members 83, respectively. As shown in FIG. 12, the holding member 83 is fixed to the end surface of the first driven gear 31 by a rivet 86 inserted into the rivet insertion hole 87.

It should be noted that both ends 83a of the holding member 83 are formed into stepwise shape via a step part and displaced so as to be away from the end surface of the driven gear 31

In addition to the flyweights 81, the holding members 83, and the like, the governor mechanism 34 includes a cylindrical or disc shape governor sleeve 91 fitted to the extended shaft portion 21c movably in the axial direction, a bifurcated pivot arm 92 abutted with a right end surface of this governor sleeve 91, and an arm shaft 93 to which this pivot arm 92 is secured. A left end surface of the governor sleeve 91 is abutted with action portions 81c of the flyweights 81. When the flyweights 81 are opened on the support pins 82 by rotation of the first balancer shaft 21, the governor sleeve 91 is pushed by the action portions 81c and moved rightward. The arm shaft 93 extends substantially vertically upward, is rotatably supported on a boss portion 6a formed in the crankcase cover 6, and further protrudes upward from the boss portion 6a.

Figure 4:
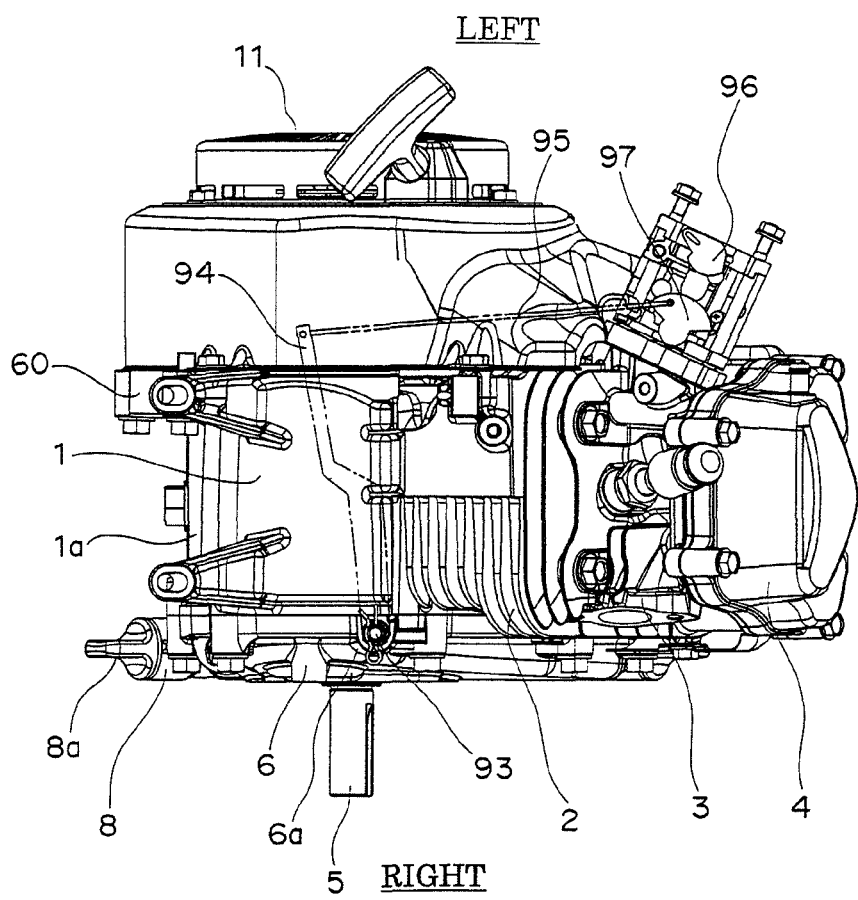
FIG. 4 is a plan view showing the engine with the inclined cylinder of FIG. 1 in which the crankcase cover, the exhaust muffler, the air cleaner, and a fuel tank are removed.

In FIG. 4, an operation arm 94 extending leftward on the upper side of the crankcase 1 as shown by imaginary lines is secured to an upper end of the arm shaft 93, and a left end of this operation arm 94 is coupled to a fuel adjustment lever 97 of a carburetor (or a throttle body) 96 via a coupling rod 95.

It should be noted that in the embodiment, the member expressed as the "crankcase cover 6" is one member substantially constituting the crankcase, which is included in the crankcase described in the claims.

Operations of the Embodiment (1) When the engine is started by the recoil starter 14 shown in FIG. 2 or the starter motor 65 shown in FIG. 7, the crankshaft 5 is rotated in the arrow A1 direction and both of the balancer shafts 21, 22 are rotated in the opposite direction A2 at the same rotation speed as the crankshaft 5 in FIG. 7. Inertia force generated by reciprocal motion of the piston 55 and rotation of the crankshaft 5 is eliminated by the weight portion 5c of the crankshaft 5 and the first and second step weight portions 21e, 21f, 22e, 22f of the balancer shafts 21, 22. Thereby, vibration of the engine is suppressed.

(2) During engine operation, as in FIG. 8, when the main bearing cap 52 and the cap bolt 53 of the connecting rod 51 are brought close to the first balancer shaft 21 and the weight 5c of the crankshaft 5 is brought close to the second balancer shaft 22, an end of the main bearing cap 52 and the cap bolt 53 pass through the space of the recess portion 21g of the first balancer shaft 21, whereas the weight 5c of the crankshaft 5 passes through the space of the recess portion 22g of the second balancer shaft 22. Thus, even when the balancer shafts 21, 22 are arranged close to the crankshaft 5, the balancer shafts 21, 22 are not brought into contact with the main bearing cap 52 and the cap bolt 53, as well as the weight 5c of the crankshaft 5.

(3) As in FIG. 11, the oil pull surface 22h for pulling up oil is formed in the second stage balance weight 22f of the second balancer shaft 22 and dipped in the oil reservoir in the crankcase 1. Thus, during the engine operation, oil is pulled up in the crankcase by rotation of the second balancer shaft 22, and the crankcase 1 and points of the cylinder head 2 are lubricated.

Effects of the Embodiment (1) Since the recess portions 21g, 22g are formed in the balancer shafts 21, 22, contact between the main bearing cap 52 and the cap bolt 53 of the connecting rod 51, the weight 5c of the crankshaft 5 and the like, and the balancer shafts 21, 22 can be avoided at the time of the rotation of the crankshaft 5 and the balancer shafts 21, 22, and thickness of the balancer shafts 21, 22 can be reduced. That is, the weight of the balancer shafts 21, 22 themselves can be reduced, and the balancer shafts 21, 22 can be brought close to the crankshaft 5 so as to be compactly arranged. Furthermore, since the second stage balance weights 21f, 22f are formed on outer peripheries of the first stage balance weights 21e, 22e, the gravity center of the entire balance weights can be brought away from the axes of the balancer shafts 21, 22 and eccentric weight of the entire balance weights (21e, 21f, 22e, 22f) of the balancer shafts 21, 22 can be increased without significantly eccentrically arranging the first stage balance weights 21e, 22e.

(2) Since the second stage balance weights 21f, 22f are arranged between the pair of crank arms 5d of the crankshaft 5 and one parts of the second stage balance weights 21f, 22f can pass between the crank arms 5d, 5d, the balancer shafts 21, 22 can be further compactly arranged while effectively utilizing a space between the crank arms 5d, 5d and increasing the eccentric weight of the balance weights (21e, 21f, 22e, 22f).

(3) Since the first stage balance weights 21e, 22e are formed into a fan shape taking each of the balancer axes as a fan pivot when seen in the axial direction of the balancer shafts 21, 22, the weight of the balancer shafts 21, 22 themselves can be reduced while avoiding contact with the crankshaft 5, the connecting rod 51, and the like. Furthermore, the gravity center of the entire balance weights can be positioned further away from the balancer axes, and the eccentric weight of the entire balance weights can be increased.

(4) Since the second stage balance weights 21f, 22f are formed into a sector shape taking each of the balancer axes as a sector pivot when seen in the axial direction of the balancer shafts 21, 22, the same effect as the configuration (3) can be obtained.

(5) As described above, since the oil pull surface 22h is formed in the second stage balance weight 22, the oil in the crankcase 1 can be pulled up and the inside of the crankcase and the points of the cylinder head can be lubricated without forming an oil pull part in the crankshaft 5 (or the connecting rod 51).

(6) In the present embodiment, the first and second balancer shafts 21, 22 are arranged substantially at an immediately above position and an immediately below position in the vicinity of the crankshaft 5. Specifically, the axes $O_1$, $O_2$ of the first and second balancer shafts 21, 22 on the upper and lower sides are arranged within the range in the front and rear direction (diameter range) W of the drive gear 30. Thus, although the first and second balancer shafts 21, 22 are provided, the size in the front and rear direction of the crankcase 1 can be decreased.

(7) As shown in FIG. 3, the axis $O_2$ of the second balancer shaft 22 on the lower side is arranged on the front side of (the cylinder side relative to) the axis $O_0$ of the crankshaft 5. Thus, the size in the front and rear direction of the crankcase 1 is decreased, and the space 51 for the arrangement of the oil level sensor can be easily ensured on the rear side of the second balancer shaft 22 on the lower side.

Figure 18:
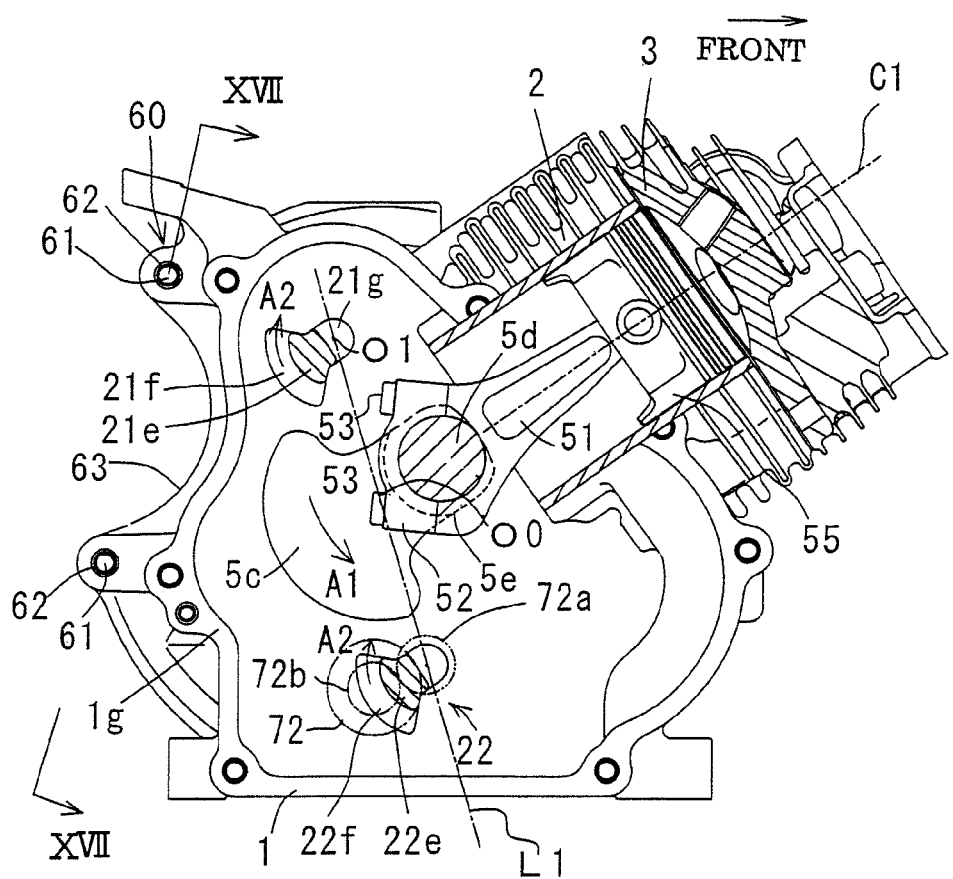
FIG. 18 is a schematic vertically-sectional view of a second embodiment of the present invention showing the engine with the inclined cylinder similar to FIG. 7.

Other Embodiments (1) FIG. 18 shows an engine with an inclined cylinder according to a second embodiment of the present invention. In a case where the engine is enlarged, instead of the oil pull-up function of utilizing the second balancer shaft 22 on the lower side, or in addition to the oil pull-up function, there is a need for providing an oil pump. The engine shown in FIG. 18 includes an oil pump 72 in the crankcase 1, a pump drive gear 72a and a pump driven gear 72b. The pump drive gear 72a, meshed with the pump driven gear 72b of the oil pump 72, is formed in the second balancer shaft 22 on the lower side. Thereby, in a lower part of the crankcase 1, the oil pump 72 can be driven by a simple transmission mechanism. Although the oil pump 72 is arranged on the rear side of the balancer shaft 22 on the lower side when seen from the side in FIG. 18, the oil pump 72 may be arranged on the front side or the lower side of the balancer shaft 22.

It should be noted that as a mechanical power transmission mechanism between the second balancer shaft 22 and a pump shaft, a mechanism other than the above gear type transmission mechanism may be adopted.

Figure 19:
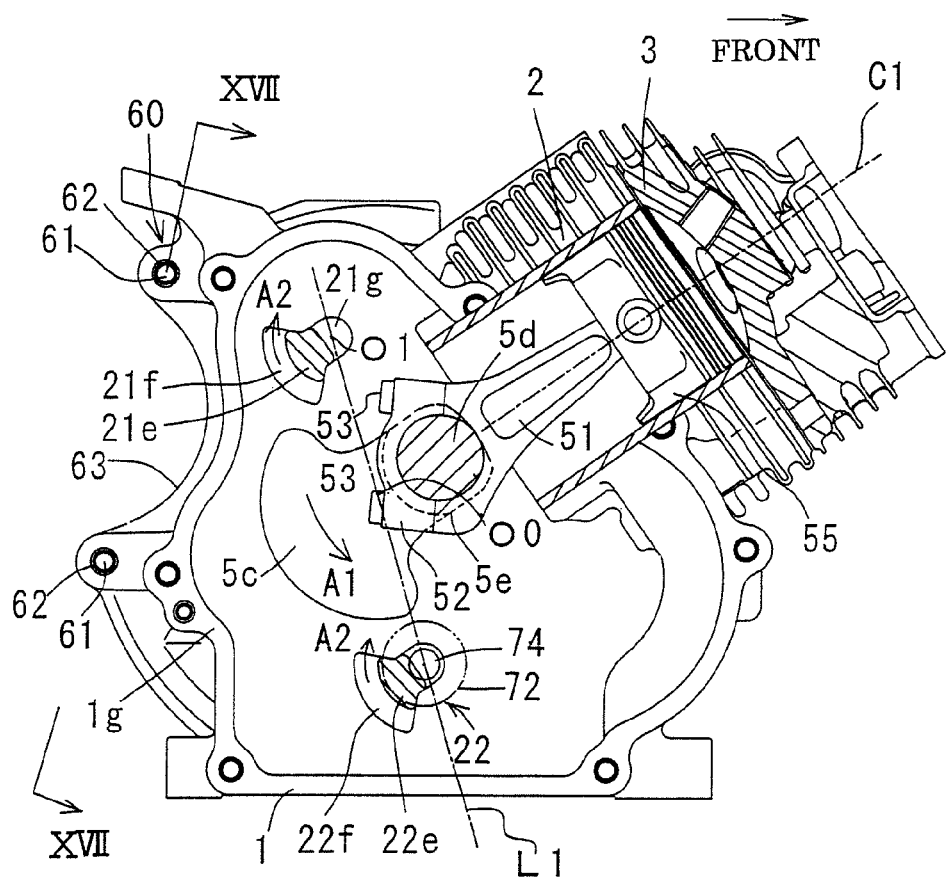
FIG. 19 is a schematic vertically-sectional view of a third embodiment of the present invention showing the engine with the inclined cylinder similar to FIG. 7.

(2) FIG. 19 shows an engine with an inclined cylinder according to a third embodiment of the present invention. Although the engine includes the oil pump 72 as well as the second embodiment, a pump shaft 74 of the oil pump 72 is arranged coaxially with the second balancer shaft 22 on the lower side, and integrally connected, not by the gear transmission mechanism, but by a coupling mechanism.

Figure 20:
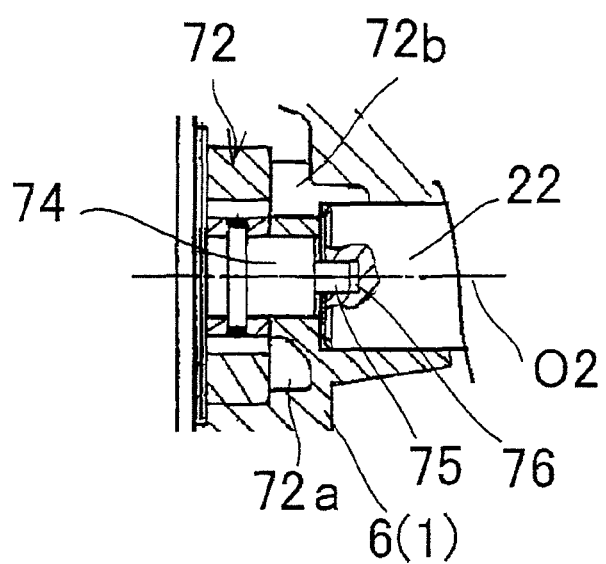
FIG. 20 is a sectional view of an oil pump part in the third embodiment.

FIG. 20 is a sectional view of the oil pump (trochoid pump) 72 of FIG. 19 in which an axis of the pump shaft 74 is set on the same straight line as the axis $O_2$ of the second balancer shaft 22 on the lower side. The coupling mechanism is formed by a projection 75 formed on an end surface of the pump shaft 74, the projection extending in the radial direction, and a radial groove 76 formed on an end surface of the second balancer shaft 22 and meshed with the projection 75. A so-called Oldham's coupling mechanism is provided.

In the oil pump 72, a pump casing part is formed integrally with the crankcase cover 6 (or the crankcase 1), and an intake port and a discharge port of the oil pump 72 respectively communicate with an oil intake passage 72a and an oil supply passage 72b formed in a wall of the crankcase cover 6.

According to the third embodiment, since there is no need for the gear transmission mechanism, the number of parts for driving the pump can be reduced.

It should be noted that, as a structure in which the pump shaft 74 is integrally connected to the balancer shaft 22, the pump shaft 74 may be integrated with the second balancer shaft 22.

(3) Although the present invention is suitable for a single-cylinder engine, the present invention may also be applied to a multi-cylinder engine.

(4) The present invention can be variously modified and changed without departing from the spirit and the scope of the present invention described in the claims.

What is claimed is:

1. An engine comprising a crankshaft and two balancer shafts, wherein:
the two balancer shafts are arranged in such a manner that the axes of the two balancer shafts have a phase angle difference of substantially 180 degrees between the balancer shafts around the crankshaft axis,
a pair of journal portions is formed on opposite ends of each of the balancer shafts in the axial direction of the balancer shaft, the journal portions being rotatably supported by a crankcase,
a first stage balance weight is formed between the journal portions, the first stage balance weight being eccentrically arranged relative to an axis of the journal portions and having a recess portion on the opposite side of an eccentricity direction of the first stage balance weight,
a second stage balance weight is formed on a substantially center part of the first stage balance weight in the axial direction of the first stage balance weight, the second stage balance weight further projects outward from the first stage balance weight in the radial direction, and the second stage balance weight is positioned between crank arms of the crankshaft when seen in a direction orthogonal to the axial direction of the balancer shaft, and one part of the second stage balance weight can pass between the crank arms.

2. The engine according to claim 1, wherein the first stage balance weight and the second stage balance weight are formed into a sector shape taking each balancer axis as a sector pivot when seen in the axial direction of the balancer shaft, and the sector shape has an open angle less than 180 degrees.

3. The engine according to claim 1, wherein the first stage balance weight and the second stage balance weight are formed into a sector shape taking each balancer axis as a sector pivot when seen in the axial direction of the balancer shaft, and the sector shape has an open angle of substantially 90 degrees.

4. The engine according to claim 1, wherein the first step weight portion is formed between the journal portions, and a driven gear and a governor mechanism are arranged near one of the journal portions.

5. The engine according to claim 1, wherein one of the balancer shafts is positioned on an upper side of the crankshaft axis and the other balancer shaft is positioned on a lower side of the crankshaft axis.

6. The engine according to claim 5, wherein the other balancer shaft, which is arranged below the crankshaft, has an oil pull surface.

7. An engine comprising:
a crankcase;
a crankshaft having a crankshaft axis, the crankshaft being rotatably supported by crankcase; and
a first balancer shaft having a first balancer shaft axis;
a second balancer shaft having a second balancer shaft axis, the first and second balancer shafts being arranged in such a manner that the axes of the first and second balancer shafts have a phase angle difference of substantially 180 degrees between the first and second balancer shafts around the crankshaft axis, and
a camshaft arranged substantially in parallel to the crankshaft, the first balancer shaft and the second balancer shaft, wherein:
ends of the first balancer shaft define a pair of journal portions rotatably supported by the crankcase,
ends of the second balancer shaft define a pair of journal portions rotatably supported by the crankcase,
each of the first and second balancer shafts having a first stage balance weight formed between the journal portions, the first stage balance weight being eccentrically arranged relative to an axis of the journal portions and defining a recess portion on an opposite side of an eccentricity direction of the first stage balance weight,
a second stage balance weight is formed on a substantially center part of the first stage balance weight in the axial direction of the first stage balance weight, the second stage balance weight projecting outward from the first stage balance weight in a radial direction, and
the second stage balance weight can be positioned between crank arms of the crankshaft when seen in a direction orthogonal to the axial direction of the respective balancer shaft so that part of the second stage balance weight can pass between the crank arms.

8. The engine according to claim 7, wherein the first stage balance weight and the second stage balance weight are formed into a sector shape taking each balancer axis as a sector pivot when seen in the axial direction of the balancer shaft, and the sector shape forms an angle less than 180 degrees.

9. The engine according to claim 7, wherein the first stage balance weight and the second stage balance weight are formed into a sector shape taking each balancer axis as a sector pivot when seen in the axial direction of the balancer shaft, and the sector shape forms an angle of substantially 90 degrees.

10. The engine according to claim 7, wherein a driven gear and a governor mechanism are arranged near one of the journal portions of the first balancer shaft.

11. The engine according to claim 7, wherein the first balancer shaft is positioned above the crankshaft axis and the second balancer shaft is positioned below the crankshaft axis.

12. The engine according to claim 11, wherein the second balancer shaft includes an oil pull surface.

13. The engine according to claim 12, wherein the axes of the crankshaft, the first balancer shaft, and the second balancer shaft are positioned on the same line.

\* \* \* \* \*